United States Patent
Jakobsson et al.

(10) Patent No.: US 6,772,339 B1
(45) Date of Patent: Aug. 3, 2004

(54) MIX AND MATCH: A NEW APPROACH TO SECURE MULTIPARTY COMPUTATION

(75) Inventors: Bjorn Markus Jakobsson, Hoboken, NJ (US); Ari Juels, Brookline, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/524,337

(22) Filed: Mar. 13, 2000

(51) Int. Cl.$^7$ .......................... H04L 9/00; H04K 1/00; G06F 19/00; G06F 9/44

(52) U.S. Cl. ................ 713/168; 713/163; 713/169; 713/180; 380/30; 380/47; 380/283; 380/285; 463/29; 717/126

(58) Field of Search .............................. 713/163, 168, 713/180, 169; 380/30, 47, 283, 285; 463/29; 717/126

(56) References Cited

U.S. PATENT DOCUMENTS

| | | | | |
|---|---|---|---|---|
| 3,800,281 A | * | 3/1974 | Devore et al. | 714/755 |
| 5,481,717 A | * | 1/1996 | Gaboury | 717/126 |
| 6,149,522 A | * | 11/2000 | Alcorn et al. | 463/29 |
| 6,396,928 B1 | * | 5/2002 | Zheng | 380/285 |

OTHER PUBLICATIONS

A. Juels and M. Jakobsson, "Millimix: Mixing in Small Batches," DIMACS Tech. Report 99–33, Jun. 1999.
Jakobsson, M., "Flash Mixing", Proceedings of 1999 ACM Symposium on Principles of Distributed Computing, pp. 83–89, 1999.
R. Gennaro, M. Rabin, and T. Rabin, "Simplified VSS and Fast–track Multiparty Computations with Applications to Threshold Cryptography", Proceedings of the Seventeenth Annual ACM Symposium on Principles of Distributed Computing, pp. 101–111, 1998.
Schnoor, C. P., "Efficient Signature Generation by Smart Cards", Journal of Cryptology, 4:161–174, 1991.
El Gamal, T., "A Public Key Cryptosystem and a Signature Scheme Based on Discrete Logarithms", IEEE Transactions on Information Theory, vol. IT–31, No. 4, pp. 469–472, Jul. 1985.
Yao, A.C., "Protocols for Secure Computations", $23^{rd}$ Annual Symposium on Foundations of Computer Science, pp. 160–164, 1982.

* cited by examiner

*Primary Examiner*—Gilberto Barrón
*Assistant Examiner*—A. Nobahar

(57) ABSTRACT

A method for secure multiparty computation is disclosed. In one embodiment, participants to a secure computation agree upon a function to be computed and a representation of the function as a circuit with at least one gate. Logical tables are then generated for each gate. A logical table includes all possible input and output values for the gate based on the function. These input and output values are then encoded and the encoded tables are passed through a mix network, which generates a blinded table for each encoded logical table. A blinded table corresponds to the encoded logical table except that its rows are randomly permuted and entries are encrypted. After this initial blinding round, participants provide encryptions of their encoded secret inputs. The participants then jointly compute the function of interest using the encrypted secret inputs and the representative circuit. To simulate a gate therein, the participants compare the encrypted inputs to the gate with each encrypted input entry in the blinded table until a match is detected. When a match is detected, the corresponding output entry in the matched row is taken to be the output of the gate. This method of mixing and matching is performed in an identical manner for every gate in the circuit, irrespective of the layer in which it resides or the function being computed, until the output of the last gate is identified.

30 Claims, 6 Drawing Sheets

| $L_i$ | $L'_i$ |
|---|---|
| 0 | 1 |
| 1 | 2 |
| 2 | 3 |

| $R_i$ | $R'_i$ |
|---|---|
| 0 | 4 |
| 1 | 5 |
| 2 | 6 |

| $f(A,B)$ | $e(f(A,B))$ |
|---|---|
| 0 | 7 |
| 1 | 8 |
| 2 | 9 |

FIG. 4

MIX AND MATCH: A NEW APPROACH TO SECURE MULTIPARTY COMPUTATION

FIELD OF THE INVENTION

This invention relates to methods for performing secure multiparty computations.

BACKGROUND OF THE INVENTION

Secure multiparty computation is the process whereby a collection of n participants compute a function $f$ on secret input values such that only the final result of the computation is made known to the participants. A. C. Yao is generally credited with innovating the notion of secure multiparty computation, offering as an example the well-known Yao's Millionaires' Problem. See Yao, A. C., "Protocols for Secure Computations", $23^{rd}$ Annual Symposium on Foundations of Computer Science, pp. 160–64, 1982. In a two-party setting, the millionaires' problem is that of enabling two entities to determine which is wealthier, without either being able to learn any additional information about the other's fortune. For example, suppose that Alice has A million dollars and Bob has B million dollars. The goal is to securely compute the function $f(A, B)$, where $f(A, B)$ is defined as=0 if A=B, 1 if A>B, and 2 if B>A.

All of the known methods for secure multiparty computation rely on the use of a circuit to simulate the particular function $f$ of interest. The circuit is generally viewed as being composed of two logical connectors, an XOR gate (binary addition) and an AND gate (binary multiplication), which together allow for the realization of any boolean function. These methods for secure multiparty computation simulate the function of interest by evaluating the circuit on a gate-by-gate basis. To simulate an XOR gate using these methods, participants can perform local addition on their respective shares. To simulate an AND gate, however, the computation must be distributed, a procedure that in the computational model generally involves a round of verifiable secret sharing (VSS). However, the circuits used in these approaches typically will contain many AND gates and, thus, the VSS associated with each AND gate can become computationally demanding. The known approaches therefore often yield rather impractical algorithms. Recent efforts have led to some efficiency improvements. See R. Gennaro, M. Rabin, and T. Rabin, "Simplified VSS and Fast-track Multiparty Computations with Applications to Threshold Cryptography", Proceedings of 1998 ACM Symposium on Principles of Distributed Computing, pp. 25–34, 1997. Even with these improvements, however, the computational costs for problems of interest remain high, and the impact on real-world applications has been negligible.

SUMMARY OF THE INVENTION

The above-identified problems are solved and a technical advance is achieved in the art by providing an innovative method for secure multiparty computation which dispenses with the need for extensive use of VSS. An exemplary method for secure multiparty computation includes: generating a data set based on a function to be computed, the data set comprising pairs of first data and second data; for each pair of first data and second data, encrypting the first data and the second data; randomly mixing pairs of the encrypted first data and second data; comparing encrypted input data with the encrypted first data to detect a match; and selecting encrypted second data corresponding to the detected match.

In accordance with one embodiment of the present invention, n participants to a secure multiparty computation agree upon a function $f$ to be computed and a representation of that function as a circuit with at least one gate. For each gate in the circuit, the participants generate a logical table. A logical table includes all possible input and output values for the gate to which it pertains based on the function $f$. The participants then preferably encode the input and output values in each logical table, and pass each table through a mix network. The mix network generates a blinded table for each encoded logical table. A blinded table is similar to its corresponding encoded logical table except that now the rows of the table are randomly permuted and the input and output values in each row are individually encrypted using a public key y. The process of generating blinded tables is referred to herein as "the mixing process."

After the initial mixing process, the participants engage in "the matching process." In this regard, the participants exchange encoded and encrypted versions of their secret inputs. These inputs are encrypted using the same public key y as used during the mixing process. The participants then jointly compute the function $f$ using the secret inputs and the representative circuit. To simulate a gate in the circuit, the participants compare the encrypted inputs to the gate with each encrypted input value in the blinded table until a match is detected. In the case where the circuit is a multi-layer circuit, the encrypted inputs to the gate are either the secret inputs provided by the participants (in the case where the gate resides in the first layer of the circuit) or the outputs of an upstream gate (in the case where the gate resides in either the output layer or some intermediate layer of the circuit). When a match is detected, the corresponding output value in the matched row is taken to be the output of the gate.

The foregoing is referred to herein as the "mix and match" method of secure multiparty computation. As will be understood, the mix and match method is performed in an identical manner for every gate in the circuit, irrespective of the layer in which it resides or the function being computed, until the output of the last gate is identified. The output of the last gate can then be decoded and decrypted using a shared secret key x to obtain the output of the function $f$.

Compared with previous approaches to secure multiparty computation, the mix and match method of the present invention is conceptually simpler, and, in many cases, is more computationally efficient as well. In addition, the method is provably secure relative to the Decision Diffie-Hellman problem, with robustness against a static malicious adversary corrupting fewer than one-half of the players.

Other and further aspects of the present invention will become apparent during the course of the following description and by reference to the attached drawings.

BRIEF DESCRIPTION OF THE DRAWINGS

FIG. 4 is a block diagram illustrating a set of conversion tables for use in plain-text encoding each of the entries in the logical tables of FIG. 3.

DETAILED DESCRIPTION

As indicated above, the mix and match method of the present invention requires a preliminary round of generating blinded tables for each gate in the circuit of function $f$. This round is referred to as the mixing process. The mixing process is then followed by a comparison of the actual secret inputs to each gate (i.e., inputs to be securely evaluated in accordance with the function $f$) against input entries in the blinded tables to detect a match. This is referred to as the matching process. We will first discuss the mixing process with reference to FIGS. 1–4. The matching process with thereafter be discussed with reference to FIG. 5.

Figure 1:
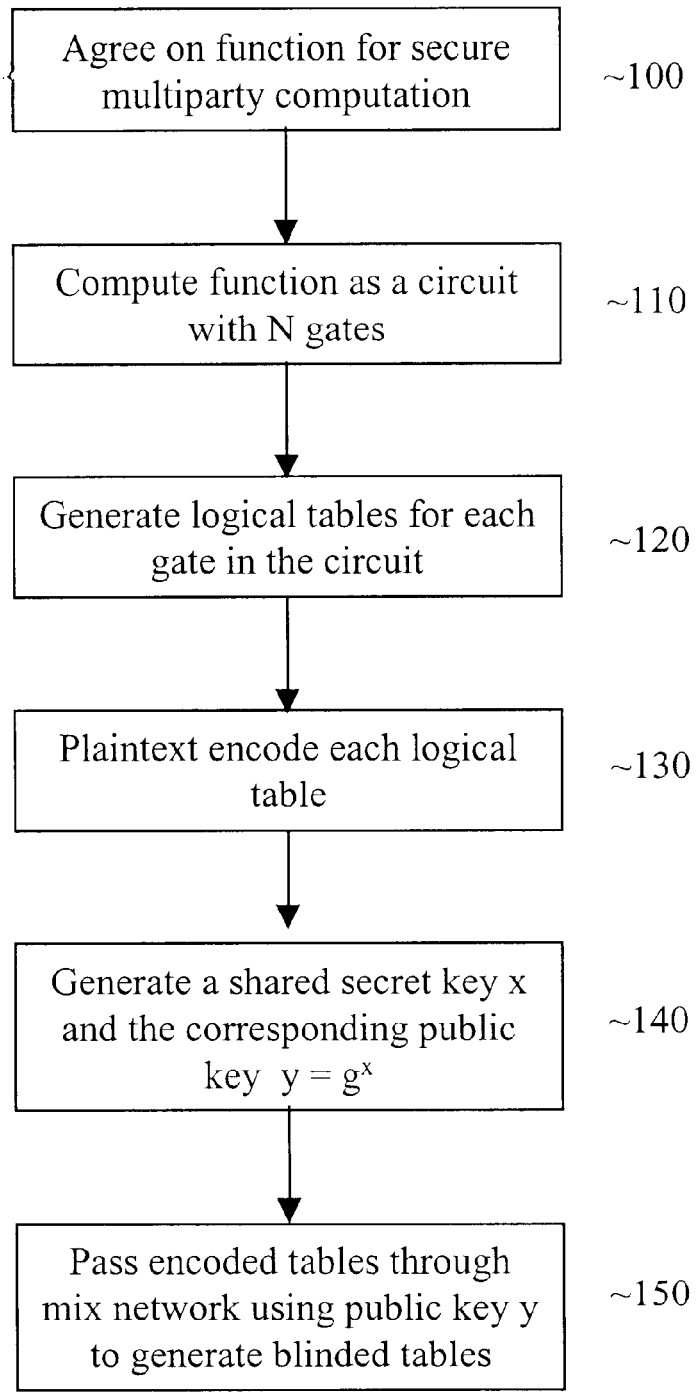
FIG. 1 is a flow chart illustrating the process of generating blinded tables for a function $f$ in accordance with the present invention.

Referring now to the drawings, FIG. 1 is a flow chart illustrating the process of generating blinded tables. In step 100, "n" participants agree on a function "$f$" to be computed in a secure manner. For purposes of illustration, the mix and match method of the present invention will be discussed in connection with evaluating Yao's millionaires' problem involving two participants Alice and Bob and two-bit input values. Thus, suppose Alice has A million dollars, where $A=a_1a_2$, and Bob has B million dollars, where $B=b_1b_2$ (Note: $a_1$ and $b_1$ represent the most significant bits and $a_2$ and $b_2$ represent the least significant bits). Recall that the millionaires' problem is that of enabling Alice and Bob to determine who is wealthier, i.e., whether A>B, without either being able to learn any additional information about the other party's fortune. Thus, Alice and Bob want to securely compute $f(A, B)$, where we can define $f(A, B)$ as=0 if A=B, 1 if A>B, and 2 if B>A. Of course, the mix and match method can be readily extended to compute the millionaires' problem involving n participants and m-bit inputs for n and m>2, and thus, serve as the foundation for e-commerce protocols involving secure auctions and bidding (e.g., a 10-way millionaires' problem). It will also be understood that the method can be readily used to perform a secure multiparty computation of any function $f$, and is in no way limited only to evaluating the millionaires' problem.

Figure 2:
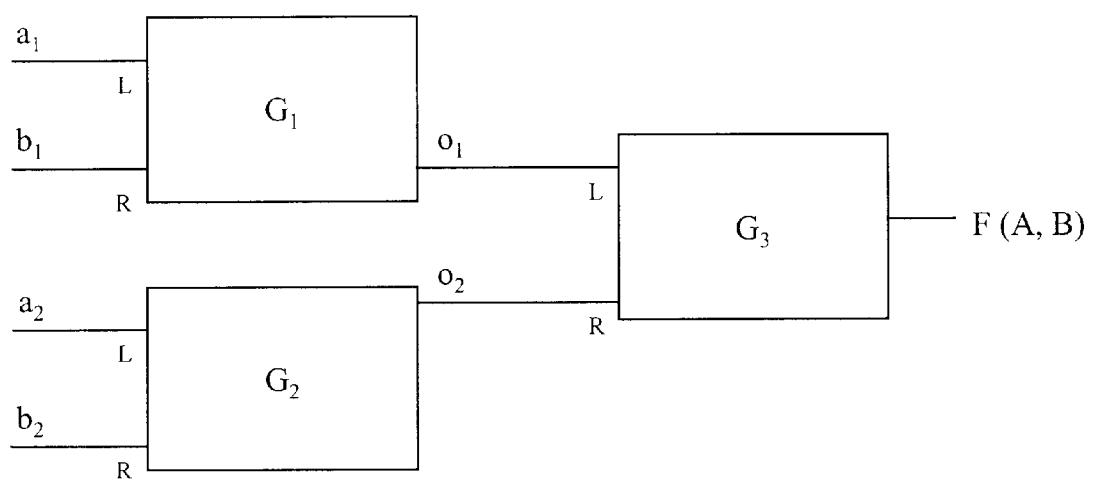
FIG. 2 is an exemplary circuit for simulating an exemplary function $f(A, B)$.

In step 110, the function $f$ agreed to by the participants is computed as a circuit. For example, as illustrated in FIG. 2, the function $f(A, B)$ can be computed using a two-layer circuit with three gates $G_1$, $G_2$ and $G_3$. Gates $G_1$ and $G_2$ form the first layer of the circuit, that is to say, the input layer. Gate $G_1$ will receive input bits $a_1$ and $b_1$ from Alice and Bob and output a ternary value $o_1$ (either 0, 1 or 2) in accordance with $f(A, B)$. Similarly, gate $G_2$ will receive input bits $a_2$ and $b_2$ and output a ternary value $o_2$ (also, either 0, 1 or 2 based on $f(A, B)$). At the second layer is gate $G_3$, which yields the output circuit. Gate $G_3$ receives input pairs $o_1$, $o_2$, and outputs a ternary value $f(A, B)$ (once again, either 0, 1 or 2 based on $f(A, B)$). It will be understood that a function can be computed in accordance with the present invention using a circuit with multiple layers and multiple inputs and/or outputs to a gate.

Figure 3:
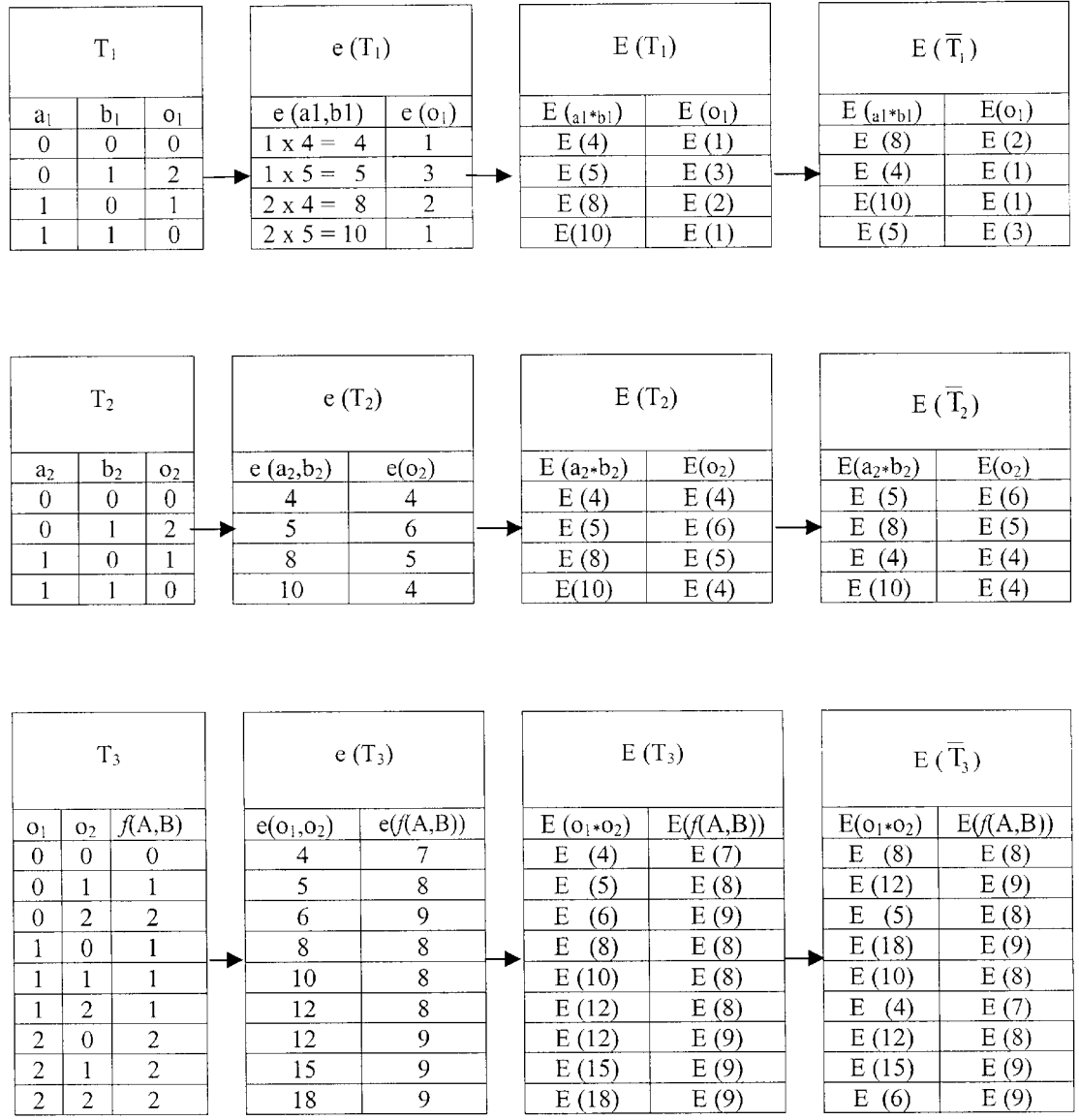
FIG. 3 is block diagram illustrating exemplary logical tables, plain-text encoded tables, encrypted tables and blinded tables for each gate in the circuit of FIG. 2.

In step 120, the participants generate logical tables for each gate in the circuit. Each logical table includes all possible plain-text input values and corresponding output values for each gate in the circuit. Logical tables for gates $G_1$, $G_2$ and $G_3$ are illustrated in FIG. 3 as tables $T_1$, $T_2$ and $T_3$, respectively. In step 130, the plain-text input and output values in tables $T_1$, $T_2$ and $T_3$ are preferably encoded as will be discussed in detail hereinafter. This results in the encoded tables $e(T_1)$, $e(T_2)$ and $e(T_3)$ shown in FIG. 3.

One reason for encoding is that it enables pairs of input values (e.g., [$a_1$, $b_1$]; [$a_2$, $b_2$]; and [$o_1$, $o_2$] as listed in tables $T_1$, $T_2$ and $T_3$) to be combined into a single integer representation, which improves the computational efficiency of both the mixing and matching processes. A single integer representation of the input value pairs can be obtained simply by multiplying the input values together. However, to ensure that the product of a pair of input values is uniquely defined, it is necessary, prior to taking their product, to first encode each input value by mapping it to a distinct set of small prime numbers in the manner discussed below in connection with FIG. 4. Another reason for encoding is that the plain-text value "0", which appears in logical tables $T_1$, $T_2$ and $T_3$, cannot be encrypted using the El Gamal encryption algorithm. (As will be discussed in detail hereinafter, El Gamal encryption is one form of encryption used in one advantageous embodiment of the present invention to encrypt the input and output values of the logical tables.)

Figure 4:
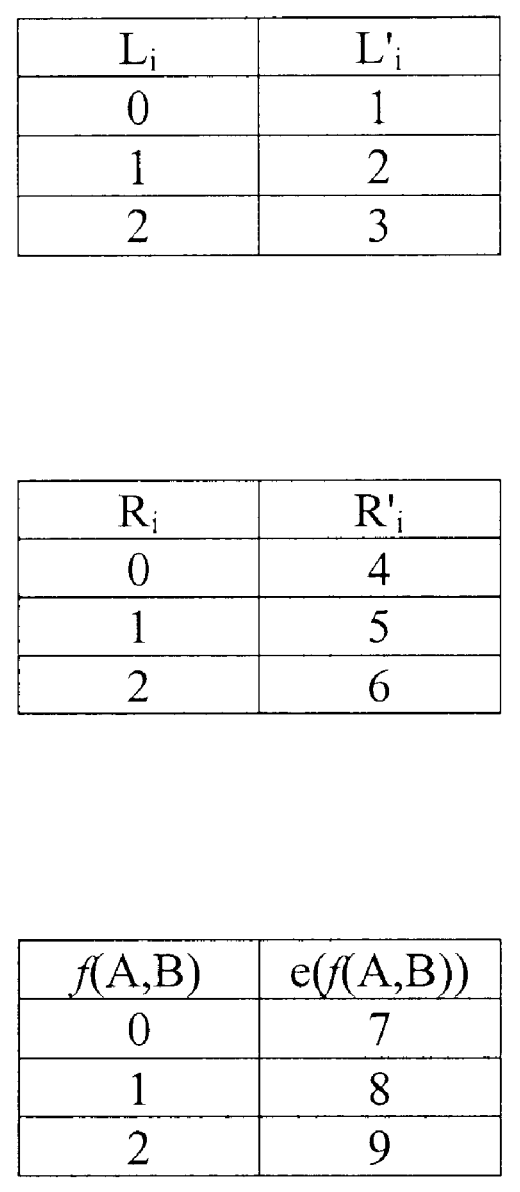

FIG. 4 illustrates an exemplary conversion table for use in the encoding process. As shown therein, left and right inputs to a gate ($L_i$ and $R_i$, respectively) are mapped into encoded values $L_i'$ and $R_i'$. Thus, the left and right inputs to any gate in the circuit of FIG. 2 would be encoded as follows: If $L_i=0$, then $L_i'=1$, if $L_i=1$, then $L_i'=2$, otherwise $L_i'=3$. Similarly, if $R_i=0$, then $R_i'=4$, if $R_i=1$, then $R_i'=5$, otherwise $R_i'=6$.

For example, left and right inputs $a_1=0$ and $b_1=0$ to gate $G_1$, would be encoded into integers 1 and 4, respectively. As discussed above, the encoded value for the pair of input values $a_1$, $b_1$ is then represented as a single integer, defined as the product of the individual encodings. Thus, the encoded value for the pair $a_1=0$, $b_1=0$ would be the integer 4. This is illustrated in the first row, first column entry in table $e(T_1)$ of FIG. 3. The outputs $o_1$ and $o_2$ from gates $G_1$ and $G_2$ would then be encoded based on the assumption that $o_1$ and $o_2$ are left and right inputs to gate $G_3$. For example, referring to the conversion table of FIG. 4, outputs $o_1=2$ and $o_2=2$ would be encoded into the integers 3 and 6, respectively. This is illustrated in the second row, second column entries in tables $e(T_1)$ and $e(T_2)$ of FIG. 3.

With respect to table $e(T_3)$ of FIG. 3, input pairs $o_1$, $o_2$ to gate $G_3$ are encoded as products in the same manner as input pairs to gates $G_1$ and $G_2$. The result of encoding the pair $o_1$, $o_2$ is shown in the first column of table $e(T_3)$. Lastly, the encoded value $e(f(A, B))$ in the second column of table $e(T_3)$ is determined with reference to the conversion table of FIG. 4, which includes an encoded value for every possible output value of $f(A, B)$.

Returning to FIG. 1, in step 140, the participants jointly compute a shared secret key x (using well-known additive (n, n) secret sharing methods or, alternatively, (t, n) verifiable secret sharing with, e.g., t=n/2). The secret key is used for decryption, and, in particular, to obtain the output of the function as will be discussed in detail below. The participants then generate and publish a public key y. The public key, which is used for encryption, is generated as is normally done for the well-known El Gamal encryption algorithm, namely, as $y=g^x$ mod p, where x is the previously selected secret key chosen uniformly at random from $Z_q$. A detailed description of this algorithm can be found in El Gamal, T., "A Public Key Cryptosystem and a Signature Scheme Based on Discrete Logarithms", IEEE Transactions on Information Theory, Vol. 31, pp. 469–72, 1985, which is incorporated herein by reference. Briefly, the generation of a public key y given a secret key x is as follows: Let q be a large prime (typically 160 bits long), let p=lq+1 be another large prime (typically 1024 bits long.), and let g be a generator of a subgroup of $G_p$. Given a secret key $x \in Z_q$, we define the corresponding public key to be the pair (y, g) where $y=g^x$ mod p. (Hereinafter, we shall implicitly assume computation in the multiplicative group $Z_p$ where applicable.) To encrypt a plain-text value m, we select an encryption exponent $\gamma \epsilon_u Z_q$, where $\epsilon_u$ denotes selection uniformly at random. The encryption consists of the pair $(\alpha, \beta)=(my^y, g^y)$. To decrypt using the secret key x, we then compute $m=\alpha/\beta^x$.

Plaintext which has been encrypted using El Gamal possesses several useful properties, the most important of which is that it is known to be semantically secure. Another useful property, known as homomorphism, which is exploited in the mix and match method of the present invention to improve computational efficiency, is as follows: If $(\alpha, \beta)$ and $(\hat{\alpha}, \hat{\beta})$ represent El Gamal encryptions of messages m and $\hat{m}$, then $(\alpha\hat{\alpha}, \beta\hat{\beta})$ represents an El Gamal encryption of the message product $m\hat{m}$. We can write $(\alpha, \beta) \times (\hat{\alpha}, \hat{\beta})$ to denote ciphertext multiplication of this sort. As will be illustrated in detail below, one embodiment of the present invention makes use of the homomorphism of El Gamal in combining separately encrypted inputs (e.g., $E(a_1)$, $E(b_1)$) into an encryption of the product of the inputs (e.g., $E(a_1*b_1)$).

In step 150 of FIG. 1, the participants pass encoded tables $e(T_1)$, $e(T_2)$ and $e(T_3)$ through a mix network. The mix network is agreed upon by the participants in advance. The mix network employed in one advantageous embodiment of the present invention is described as follows: As previously discussed, all participants are provided with the public key y which is used for computing ciphertexts. Input to the mix network consists of a list $M_1, M_2, \ldots, M_k$ of plaintext pairs. In other words, $M_i=(m_{i0}, m_{i1})$. (Although inputs to mix networks are typically assumed to be ciphertexts, a mix network may be trivially adapted to allow for plaintext inputs. This can be accomplished simply by letting the inputs consist of ciphertexts with an encryption exponent 0.) The output of the mix network is a random permutation of the list $M'_1, M'_2, \ldots, M'_k$, where $M'_i=(E_{i0}, E_{i1})$ and $E_{ij}$ represents an El Gamal encryption of $m_{ij}$ under public key y.

Another mix network which is suitable for use in the present invention is a variant of the one presented in Jakobsson, M., "Flash Mixing", Principles of Distributed Computing '99, pp. 83–89, 1999, a copy of which is incorporated herein by reference. Flash mixing takes a vector of ciphertexts (e.g., El Gamal ciphertexts) and produces an output that consists of another vector of ciphertexts. For each input ciphertext there is one output ciphertext that corresponds to the same plaintext; however, the order (i.e., the mapping between input items and output items) is randomized and cannot be determined by a minority of mix servers. This mix network is believed to be the most computationally efficient known to date for large input vectors. With the following modifications to this mix network, multiple tables can be processed simultaneously using a single mix action, thereby increasing computational efficiency.

The first modification to this mix network is as follows: Since one embodiment of the present invention manipulates table rows consisting of input and output pairs, the mix network must be modified to apply to pairs (or more generally tuples), rather than singletons. Therefore, assume that we wish to apply a mix network to a vector L whose elements consist of pairs of messages. We require that the pairs be randomly permuted, but for pair items to remain together. Let $(m_{i1}, m_{i2})$ be the $i^{th}$ pair in the vector L. We use L to construct three vectors, $L_1$, $L_2$, and $L_3$. Vector $L_1$ consists of the leading items from the pairs in L. That is, $L_1=\{m_{11}, m_{21}, m_{31}, \ldots\}$. Similarly, $L_2$ consists of the second items from the pairs in L. In other words, $L_2=\{m_{12}, m_{22}, m_{32}, \ldots\}$. The vector $L_3$ consists of the inverse products of pair items. In particular, $L_3=\{1/m_{11}m_{12}, 1/m_{21}m_{22}, 1/m_{31}m_{32}, \ldots\}$. The vector $L_3$ acts as a "checksum" to ensure that $L_1$ and $L_2$ are mixed identically, and that pair items therefore remain coupled in the mix output.

We now input each of the vectors $L_1$, $L_2$ and $L_3$ to the mix, using different re-encryption factors but the same permutations for each. For optimal performance, mixing on the three vectors is executed in parallel, allowing the participants to the mix to compute addition chains for re-encryption on all three mix instances at the same time. Let $L'_1$, $L'_2$, and $L'_3$ be the random permutations on $L_1$, $L_2$, and $L_3$ respectively output from the mix network. Let $E'_{i1}$, $E'_{i2}$, and $E'_{i3}$ be the $i^{th}$ (encrypted) entries in vectors $L'_1$, $L'_2$, and $L'_3$ respectively. To check that the mix has been executed correctly, that is, that the same permutation has been applied to all three vectors, participants verify that $(E'_{i1}*E'_{i2}*E'_{i3})$ is an encryption of the value 1 for all i. If so, then a vector L' representing a random permutation (and encryption) of the pairs in L may be constructed as $\{(E'_{11}, E'_{12}), (E'_{21}, E'_{22}), (E'_{31}, E'_{32}), \ldots\}$. It will be understood by those skilled in the art that this technique can be readily extended to vectors L consisting of k-tuples (e.g., for tables applying to gates with more than two inputs such as in cases where encoding is not employed to combine input data).

The second modification to the mix network is directed to robustly partitioning the output of the mix server into blinded tables. Let us suppose that we wish to partition a vector L into sets $T_1, T_2, \ldots, T_N$. If L is instead a vector of tuples, it suffices to partition the singleton vector $L_1$ as defined above. Correct identification of tuples across vectors will then enable a correct partitioning of the full vector L to be achieved. Therefore, we may assume that L is a singleton vector.

There are two stages of re-encryption and permutation in the scheme set forth in the above-referenced "Flash Mixing." After completion of both stages, servers reveal the permutations and re-encryption exponents employed in the first stage. Thus, the desired partition on elements at the beginning of the second stage is known to all servers. It suffices, therefore, simply to trace the partition through the second stage. To do this, we have each mix server identify the sets $\{T_i\}$ in the vector it outputs at the end of the second stage. Additionally, each server reveals the sum (modulo q) of the re-encryption exponents for each set. Let us denote the exponent sum for set $T_i$ by $\gamma_i$, and denote by $T'_i$ the elements in the final output vector claimed by a given mix server to belong to $T_i$. The other mix servers verify for each set $T_i$ that $\gamma_i$ is correct, and that the product of the elements in $T_i$ (with the re-encryption exponents factored out using knowledge of $\gamma_i$) is the same as for the elements of $T'_i$. If the verification holds for all servers, then a correct partitioning will be achieved. If cheaters are detected, they are replaced.

Yet another mix network which is suitable for use in the present invention is the one presented in A. Juels and M. Jakobsson, "Millimix: Mixing in Small Batches," DIMACS Tech. Report 99–33, 1999, a copy of which is incorporated herein by reference. It is believed to be the most computationally efficient for small input vectors.

Regardless of the particular mix network employed, participants will use it to compute blinded tables $\overline{T}_1, \overline{T}_2, \ldots, \overline{T}_N$ from the input tables $T_1, T_2, \ldots, T_N$. Returning to FIG. 3, the encrypted tables generated by the mix network in connection with the evaluation of $f(A, B)$ are shown in FIG. 3 as tables $E(T_1)$, $E(T_2)$ and $E(T_3)$. The "blinded" tables, which consist of a random permutation of rows in the corresponding encrypted tables, are illustrated in FIG. 3 as tables $E(\overline{T}_1)$, $E(\overline{T}_2)$ and $E(\overline{T}_3)$. Both the encryption of table entries and the permutation of rows are performed by the mix network in a robust and secure manner. In other words, the resulting blinded table $E(\overline{T}_i)$ is such that, even if the participants try to cheat, no one can link any of the rows in $\overline{T}_i$ with the corresponding row in $E(\overline{T}_i)$ with a probability better than a guess made uniformly at random. After this preliminary blinding round, the participants are ready to evaluate the function $f(A, B)$. The evaluation of $f(A, B)$ is illustrated in connection with FIG. 5.

Figure 5:
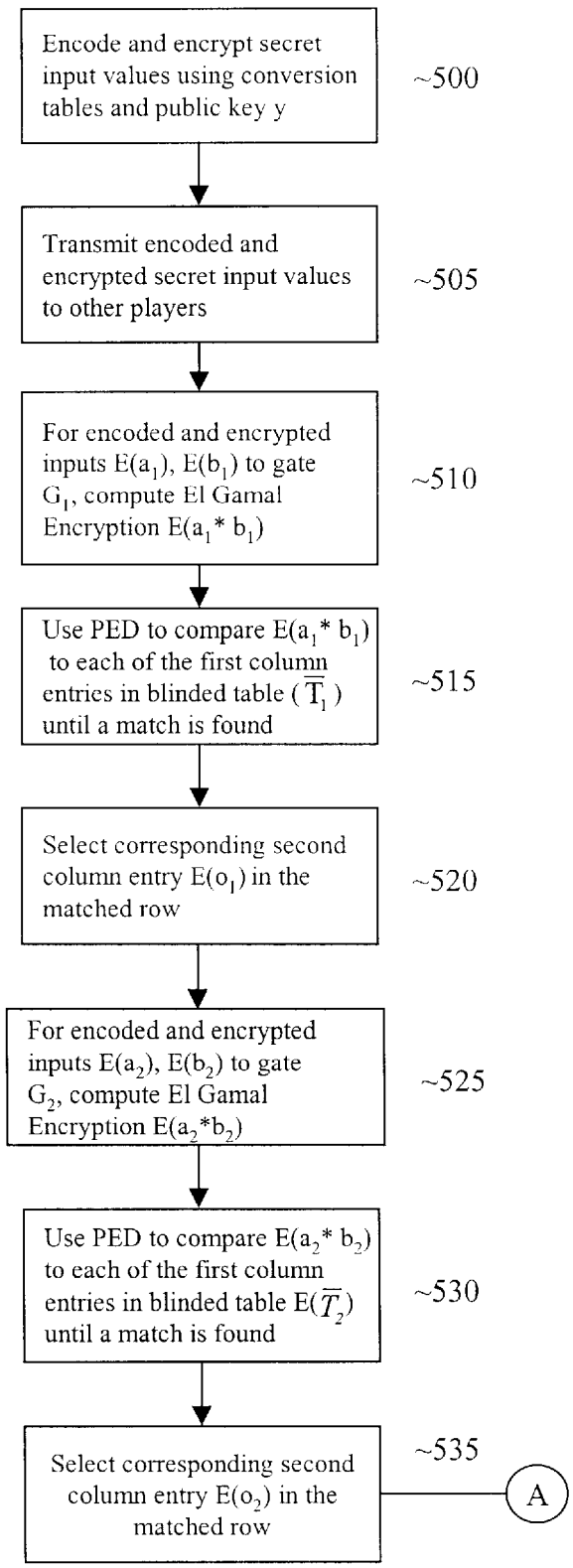
FIG. 5 is an exemplary flow chart illustrating a secure multiparty computation performed in accordance with the present invention.
Figure 5:
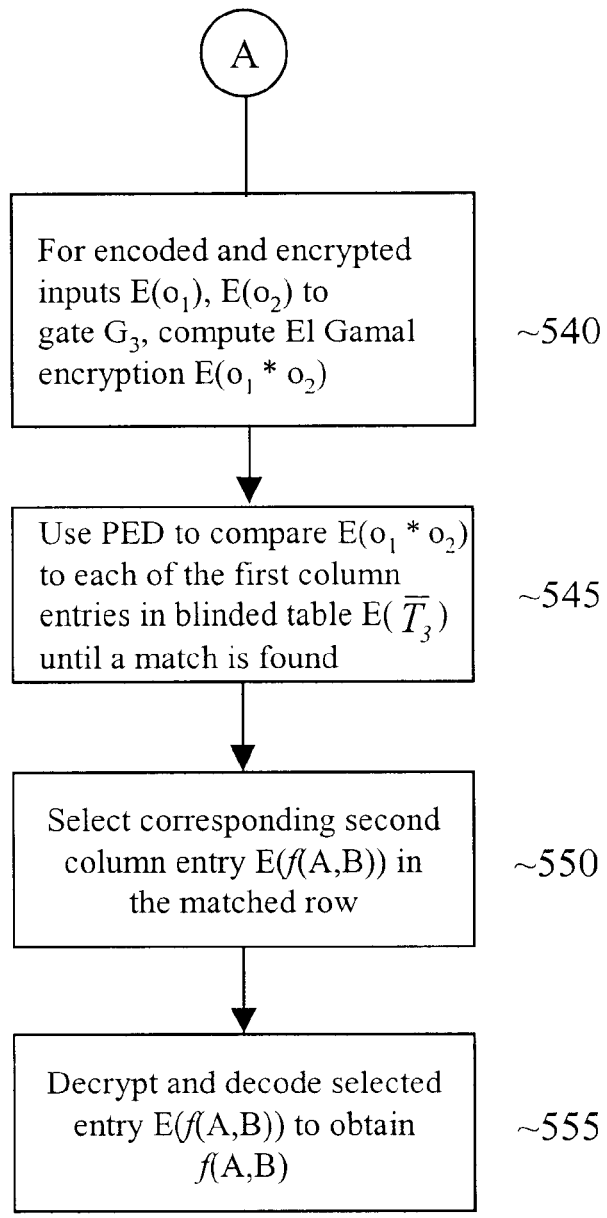

FIG. 5 is a flow chart illustrating an exemplary secure multiparty computation of the function $f(A, B)$ performed in accordance with the present invention. In step 500, each participant encodes his or her secret input bits using the conversion tables of FIG. 4, and then encrypts the encoded input bits using public key y. For example, Alice would generate $E(a_1)$ and $E(a_2)$, while Bob would generate $E(b_1)$ and $E(b_2)$. In step 505, each participant broadcasts his or her encrypted input bits to all of the other players. As will be performed for each gate in the circuit, in step 510, the participants combine the separately encrypted inputs $E(a_1)$ and $E(b_1)$ to gate $G_1$ into the input $E(a_1*b_1)$ by taking the product of $E(a_1)$ and $E(b_1)$. In step 515, each participant uses a Plaintext Equality Decision ("PED") to compare $E(a_1*b_1)$ to each of the first column entries in blinded table $\overline{T}_1$ until a match is found. In step, 520, the participants select the corresponding second column entry $E(o_1)$ in the matched row.

The PED protocol can be described briefly as follows: Let c and ĉ represent El Gamal encryptions of plaintext m and m̂ with respect to the same public encryption key y. The PED protocol enables a set of participants who share a secret key x corresponding to a public key y to determine jointly whether m=m̂. This determination may be made without revealing any additional information. We write that PED (c, ĉ)=1 if the proof is successful, and 0 if it is unsuccessful. The PED protocol may be realized using any of a number of well-known mechanisms, such as a distributed Schnorr signature (See, e.g., Schnorr, C. P., "Efficient Signature Generation by Smart Cards", Journal of Cryptology, 4:161–174, 1991) or a DSS signature (See, e.g., Digital Signature Standard, Federal Information Processing Standards Publication 186, 1994).

While there are many possible methods for implementing the PED protocol, we believe the following one strikes an especially good balance between efficiency and provability. Recall that PED takes as input a pair of El Gamal ciphertexts (c, ĉ) and determines, with the joint participation of the players, whether c and ĉ share the same plaintext. We shall denote c by the El Gamal ciphertext pair $(\alpha, \gamma)$, and ĉ by $(\hat{\alpha}, \hat{\beta})$.

The first step in the computation is for the participants individually to compute $(\gamma, \delta)=(\alpha/\hat{\alpha}, \beta/\hat{\beta})$. If m=m̂, then m/m̂=1, so $(\gamma, \delta)$ will represent an encryption of the plaintext value 1. Observe that in this case, we will have $\log_\delta \gamma = \log_g y$. Thus, we construct PED in such a way that the participants determine the equivalence of discrete logs between the pairs $(\gamma, \delta)$ and $(g, y)$.

First, each participant i computes a random $z_i$ and $(\gamma_i, \delta_i) = (\gamma^{z_i}, \delta^{z_i})$. Then each participant i proves that $\log_\delta \gamma_i = \log_\delta \gamma$. This may be accomplished through a Schnorr proof of knowledge on $(\delta_i^{c_i}\gamma_i, \delta^{c_i}\gamma)$, where $c_i$ is a random challenge generated jointly by the other participants. It is also possible for participant i to prove the equivalence using an undeniable signature. The participants then compute $(\gamma', \delta') = \Pi_i(\gamma_i, \delta_i)$. Next, each participant computes and broadcasts a partial decryption $d_i = \delta'^{x_i}$ of the ciphertext $(\gamma', \delta')$. Each participant also broadcasts a proof that $\log_{\delta'} d_i = \log_g y_i$, i.e., that his partial decryption is correctly formed. This may be accomplished using a Schnorr proof of knowledge as described above. Participants then combine the partial decryptions multiplicatively to obtaion $d = \Pi_i d_i$. The value $\gamma'/d$ represents a decryption of the ciphertext $(\gamma', \delta')$. If the result of this decryption is 1, then the output of PED is 1. Otherwise, it is 0.

If at any time, a participant provides an incorrect proof, then that participant is removed from participation in the protocol through redistribution of her secret key among other participants in the standard manner. Note that for the mix-and-match algorithm, it is possible to employ an "optimistic" variant on PED in which participants omit the step of broadcasting a proof that $\log_{\delta'} d_i = \log_g y_i$. In this case, if no match is found for any table entry, then participants must provide all omitted proofs for the table lookup in question.

Random challenges in PED are typically 160 bits in length. These challenges may be replaced with hash images by executing Schnorr proofs instead as standard Schnorr signatures. In this case, the security of the construction depends in part upon the properties of the hash function h used in the signature generation.

Returning to FIG. 5, in step 525, the participants combine the separately encrypted inputs $E(a_2)$ and $E(b_2)$ to gate $G_2$ into the input $E(a_2*b_2)$ by taking the product of $E(a_2)$ and $E(b_2)$. In step 530, each participant again uses the PED algorithm to compare $E(a_2*b_2)$ to each of the first column entries in blinded table $\overline{T}_2$ until a match is found. In step 535, the participants select the corresponding second column entry $E(o_2)$ in the matched row. In step 540, the participants combine the encoded and encrypted inputs $E(o_1)$ and $E(o_2)$ to gate $G_3$ into the input $E(o_1*o_2)$ by taking the product of $E(o_1)$ and $E(o_2)$. In step 545, the participants again use the PED algorithm, this time to compare $E(o_1*o_2)$ against each of the first column entries in blinded table $\overline{T}_3$ until a match is found. Once a match is found, in step 550, the participants select the corresponding second column entry $E(f(A, B))$ in the matched row. Finally, in step 555, the participants jointly decrypt the selected entry using private key x, and then individually decode the result using the conversion table of FIG. 4 to obtain the value $f(A, B)$, which, as defined at the outset, will be either 0 if A=B, 1 if A>B, or 2 if B>A. Observe that at all times, all values manipulated by the parties were encrypted, and each lookup was performed in separate blinded tables. As a consequence, at no time were any participants able to determine any information about the other's fortune, apart from the final value $f(A, B)$.

Given the present disclosure, it will be understood by those of ordinary skill in the art that the mix and match method of the present invention may be readily implemented using one or more processors in communication with one or more memory devices having embodied therein stored programs for performing the above-described mix and match method.

The many features and advantages of the present invention are apparent from the detailed specification, and thus, it is intended by the appended claims to cover all such features and advantages of the invention which fall within the true spirit and scope of the invention.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims. For example, the mixing process of the present invention may be pre-computed by a trustee for use, e.g., in an auction, and the gate tables transmitted to the auction participants who then perform the matching process.

We claim:

1. A method for secure multiparty computation comprising: generating a data set based on a function to be computed, said data set comprising pairs of first data and second data; for each pair of first data and second data, encrypting said first data and said second data; mixing pairs of encrypted first data and second data; comparing encrypted input data with said encrypted first data to detect a match; and selecting encrypted second data corresponding to said detected match.

2. The method of claim 1, further comprising encoding said first data and said second data of each pair.

3. The method of claim 2, wherein said first data of each pair comprises a plurality of data values and said second data of each pair comprises a plurality of data values, and wherein for each pair of first data and second data, encoding includes representing said first data as a single integer and said second data as a single integer.

4. The method of claim 1, wherein said first data comprises inputs to a gate in a circuit for simulating said function, and said second data comprises a corresponding output from said gate.

5. The method of claim 1 wherein said encrypted input data is input data from a plurality of players.

6. The method of claim 1 wherein said encrypted input data is output data from a plurality of gates.

7. The method of claim 1 wherein said encrypting is performed using a public key generated using El Gamal encryption.

8. A method for secure multiparty computation comprising: generating a data set based on a function to be computed, said data set comprising pairs of first data and second data; for each pair of first data and second data, encrypting said first data and said second data; mixing pairs of encrypted first data and second data; comparing encrypted input data with said encrypted first data to detect a match; and selecting encrypted second data corresponding to said detected match, wherein encrypting and mixing are performed by passing said first data and said second data through a mix network.

9. A method for secure multiparty computation comprising: generating a data set based on a function to be computed, said data set comprising pairs of first data and second data; for each pair of first data and second data, encrypting said first data and said second data; mixing pairs of encrypted first data and second data; comparing encrypted input data with said encrypted first data to detect a match; and selecting encrypted second data corresponding to said detected match, wherein said comparing encrypted input data with said encrypted first data to detect a match includes using a plaintext equality decision (PED) protocol to detect a match.

10. The method of claim 9, wherein said PED protocol is realized using a Schnorr signature or a DSS signature.

11. A method for secure multiparty computation comprising: generating a data set based on a function to be computed, said data set comprising pairs of first data and second data; for each pair of first data and second data, encrypting said first data and said second data; mixing pairs of encrypted first data and second data; comparing encrypted input data with said encrypted first data to detect a match; and selecting encrypted second data corresponding to said detected match, further comprising calculating a product of said encrypted input data, and wherein said comparing encrypted input data with said encrypted first data to detect a match includes comparing said product with said encrypted first data.

12. A method for secure multiparty computation comprising: generating a data set based on a function to be computed, said data set comprising pairs of first data and second data; for each pair of first data and second data, encrypting said first data and said second data; mixing pairs of encrypted first data and second data; comparing encrypted input data with said encrypted first data to detect a match; and selecting encrypted second data corresponding to said detected match, further comprising decrypting said encrypted second data corresponding to said match.

13. The method of claim 12 wherein said decrypting is performed using a secret key.

14. The method of claim 13 wherein said secret key is a shared secret key.

15. A method for secure multiparty computation comprising: representing a function as a circuit with a gate; generating a logical table for said gate, said logical table having entries of input and output values defined by said function; generating an encoded table, said encoded table having entries of encoded versions of said input and output values; generating a blinded table, said blinded table comprising said encoded table with said encoded input and output values encrypted and rows permuted; receiving encrypted input values; comparing said received encrypted input values against said encrypted input values in said blinded table to detect a match; and selecting an encrypted output value corresponding to said matching encrypted input value in said blinded table.

16. The method of claim 15 wherein said input and output values represent inputs to and outputs from said gate.

17. The method of claim 15, wherein said encoded table includes single integer representations of said input and output entries.

18. The method of claim 15 wherein said received encrypted input values are input data from a plurality of participants.

19. The method of claim 15 wherein said received encrypted input values are output data from a plurality of gates.

20. The method of claim 15 wherein said generating a blinded table includes encrypting said encoded input and output values with a public key.

21. The method of claim 15 wherein generating a blinded table includes passing said encoded input and output values through a mix network.

22. The method of claim 15, wherein said comparing includes using a plaintext equality decision (PED) protocol to detect a match.

23. The method of claim 22, wherein said PED protocol is based upon a Schnorr signature or a DSS signature.

24. The method of claim 15 further comprising calculating a product of said received encrypted input values, and wherein said comparing said received encrypted input values against said encrypted input values in said blinded table to detect a match includes comparing said product with said encrypted input entries in said blinded table.

25. The method of claim 15 further comprising decrypting said output value corresponding to said matching input value.

26. The method of claim 25 wherein said decrypting is performed using a secret key.

27. The method of claim 26 wherein said secret key is a shared secret key.

28. A method for secure multiparty computation comprising: receiving mixed pairs of encrypted first data and second data; comparing encrypted input data with said encrypted first data to detect a match; and selecting encrypted second data corresponding to said detected match.

29. The method of claim 1 wherein said encrypting is performed using semantic encryption.

30. The method of claim 1 wherein said mixing and comparing are performed by a plurality of entities.

* * * * *